(12) United States Patent
Byrnes et al.

(10) Patent No.: US 10,372,704 B2
(45) Date of Patent: Aug. 6, 2019

(54) SIMILARITY METRIC RELATIVIZED TO A USER'S PREFERENCES (71) Applicant: SRI International, Menlo Park, CA (US)

(72) Inventors: John Byrnes, Menlo Park, CA (US); Dayne Freitag, La Mesa, CA (US); Robert Sasseen, Menlo Park, CA (US); Melinda Gervasio, Mountain Park, CA (US)

(73) Assignee: SRI International, Menlo Park, CA (US)

( * ) Notice: Subject to any disclaimer, the term of this patent is extended or adjusted under 35 U.S.C. 154(b) by 719 days.

(21) Appl. No.: 14/842,483

(22) Filed: Sep. 1, 2015

(65) Prior Publication Data

US 2016/0092781 A1 Mar. 31, 2016

Related U.S. Application Data (60) Provisional application No. 62/044,762, filed on Sep. 2, 2014.

(51) Int. Cl.
*G06N 7/00* (2006.01)
*G06F 16/242* (2019.01)
*G06Q 30/02* (2012.01)
*G06F 16/435* (2019.01)

(52) U.S. Cl.
CPC ........ *G06F 16/2425* (2019.01); *G06F 16/435* (2019.01); *G06Q 30/0255* (2013.01); *G06N 7/005* (2013.01)

(58) Field of Classification Search
CPC ...................................... G06N 7/005
USPC .......................................... 706/45
See application file for complete search history.

(56) References Cited

U.S. PATENT DOCUMENTS

2013/0103609 A1* 4/2013 Kirshenbaum ........ G06Q 30/02 705/347
2014/0012870 A1* 1/2014 Wark ................ G06F 17/30539 707/769

OTHER PUBLICATIONS

Hofmann, Thomas, Probabilistic latent semantic analysis. 1999, Proceedings of the Fifteenth conference on Uncertainty in artificial intelligence, Morgan Kaufmann Publishers Inc., 289-296.*

* cited by examiner

*Primary Examiner* — Lut Wong
(74) *Attorney, Agent, or Firm* — Hickman Palermo Becker Bingham LLP; Christine E. Orich (57) ABSTRACT

Mathematical technologies for recommending content to a user based on a user's preferences are disclosed. Embodiments of these technologies can generate a probabilistic representation of a data set, and then adjust the probabilistic representation to reflect a user-specific weighting scheme. The user preference-adjusted representation of the data set can be used to recommend content to the user.

24 Claims, 3 Drawing Sheets

SIMILARITY METRIC RELATIVIZED TO A USER'S PREFERENCES

CROSS-REFERENCE TO RELATED APPLICATIONS

This application claims the benefit of and priority to U.S. Provisional Patent Application Ser. No. 62/044,762, filed Sep. 2, 2014, which is incorporated herein by this reference in its entirety.

BACKGROUND

A recommendation system attempts to present a user with items most likely to match a user's tastes. A common recommendation system uses collaborative filtering to recommend content to a user. For example, given a list of past items, a recommendation system may be configured to determine which items are similar to previous items in the list. A data-driven system will typically represent each item as a set of feature values (e.g., meta data), and call two items similar when they are "close" to each other under some measure dependent on the features.

For example, a movie recommendation system might represent a given movie by its list of actors, its director, and its genre. Two movies may be considered similar when several of these values overlap. The simplest type of collaborative filtering system treats users as features of an item; thus, two items are similar when many of the same users have chosen both items. In another example of a recommendation system using collaborative filtering, some shopping websites may suggest additional purchases to a user purchasing an item based on what other users who purchased the same item also purchased (regardless of whether those other users have any other interests in common with the current user). Thus, in collaborative filtering, auto-generated messages such as "Shoppers who purchased that item also purchased this" are not based on or triggered by the user's past personal purchasing history or preferences. Rather, the suggested item "also purchased this" is one that many other users have purchased in combination with the first item ("that item"). Moreover, those "other" users that are the basis of the recommendation may not have any of the same interests or objectives as the user.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Figure 1:
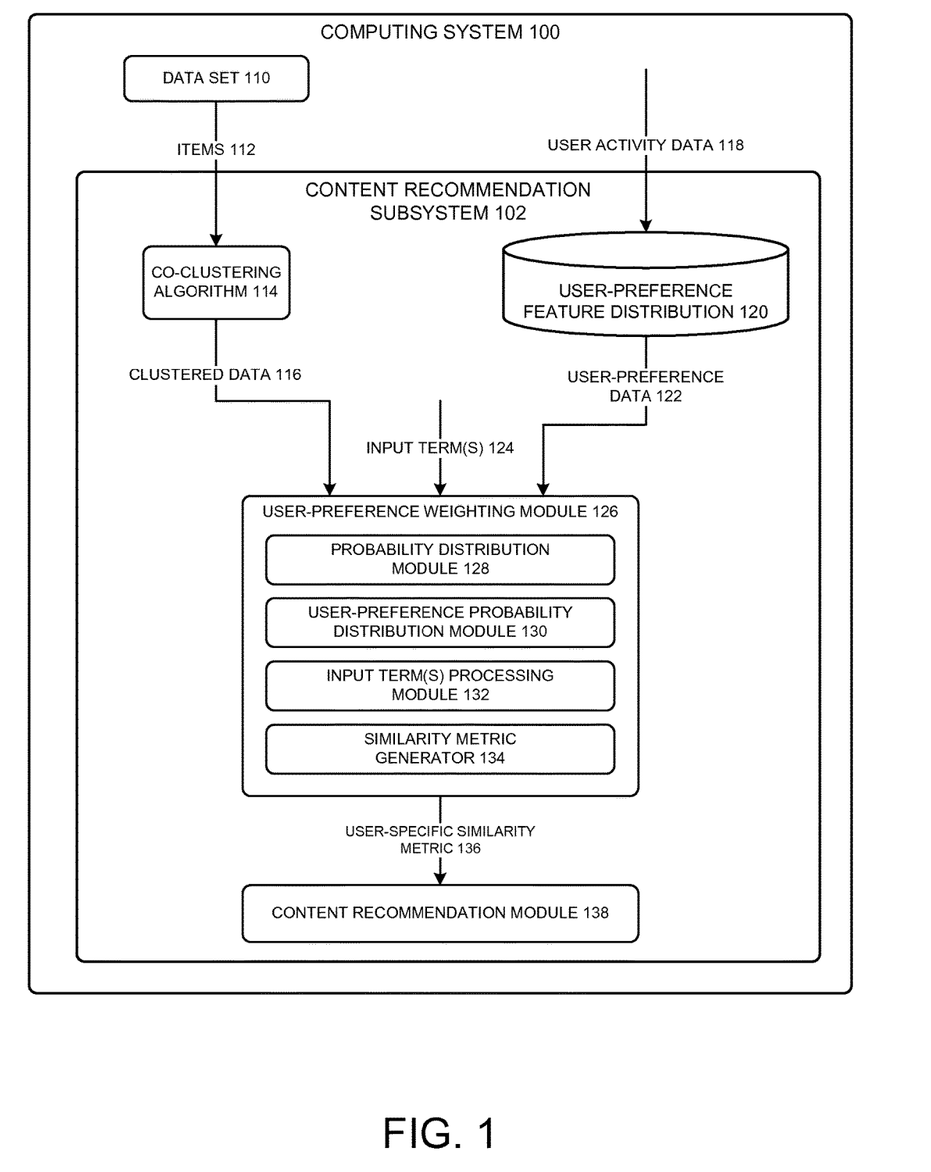
FIG. 1 is a simplified schematic diagram of at least one embodiment of an environment of a computing subsystem comprising a content recommendation system as disclosed herein.

Referring to FIG. 1, in one embodiment, a content recommendation subsystem 102 executable by a computing system 100 is shown. The illustrative embodiment (e.g., native or virtual "runtime" or "execution" environment) of the computing system 100 includes the content recommendation subsystem 102. The computing system 100 is capable of storing any number of items of content, and the content recommendation subsystem 102 is capable of recommending additional content (e.g., content of which the user is not otherwise or previously aware) to a user based on preferences that are measured relative to the particular user, without needing to rely on content or activities of other users. For example, aspects of the content recommendation subsystem 102 can improve upon results obtained through collaborative filtering, by personalizing the recommendations developed through collaborative filtering according to a specific user's activities, interests, or preferences. In other embodiments, aspects of the content recommendation subsystem 102 can generate personalized content recommendations independently of a collaborative filtering system or other type of recommendation system. In other words, the content recommendation subsystem 102 can be implemented alone or in combination with other types of recommendation systems (e.g., collaborative filtering).

The illustrative content recommendation subsystem 102 receives or accesses a data set 110 of information, which is composed of items 112. As used in this application, a data set 110 may refer to any collection of data or information that is searchable by a user or by a computer program. As used in this application, items 112 may refer to any type of searchable electronic data file (or other type of data structure) that includes one or more features. For example, a data set may be a baseball statistics data set where each item is a given player and each feature is a given statistic. As another example, a data set may be a set of web pages, video files, and/or music files that the user has recently accessed. An individual news article, video file, or music file would be an item in the data set. In this data set, features may include terms (e.g., words or phrases) contained in the web pages or extracted from the video and/or music files, and may also include meta data associated with the web pages, video files, and/or music files (e.g., title, author, genre, etc.).

The data set 110 may be stored locally on the computing system 100, or may be stored elsewhere, depending on the application. In the event that the data set 110 is stored external to the computing system 100, the computing system 100 is configured to access the data set 110 via one or more networks. Irrespective of the location in which the data set 110 (or individual items of the data set 110) are stored, in some embodiments, the data set 110 is limited to items that are personal to a specific user, such as content (e.g., documents, messages, social media posts, etc.) that are created by or accessed by the user, the user's personal reading history, transaction history, etc. However, the data set 110 may in some embodiments include items that are generated or accessed across multiple different software applications. In other words, the user's personal data set 110 can include items ranging from purchase history across a variety of e-commerce applications, video playing history, search history, messages and social media posts, etc. In some implementations, the data set 110 is limited to items that the user or a computing system has specifically marked as private to the user and not sharable with other users, devices, or systems. This allows embodiments of the content recommendation subsystem 102 to operate even when a larger data set containing information for a broader population of users is not available (for example, when a mobile device is not connected to a network). In other embodiments, however, the data set 110 may include items that are specific to a particular user as well as items that are associated with other users or a population of users.

The data set 110 is shown merely as an illustrative example, the computing system 100 and the content recommendation subsystem 102 may be configured to store and analyze any number of data sets of documents and/or other electronic content. The computing system 100 includes any requisite communication mechanism and protocols needed for effectuating a content recommendation based on an analysis of the chosen data sets.

The illustrative content recommendation subsystem 102 is embodied as a number of machine-readable components, such as instructions, modules, data structures and/or other components, which may be implemented as computer hardware, firmware, software, or a combination thereof. Portions of the content recommendation subsystem 102 may be executed by other computing devices in communication with computing system 100, as described below with reference to FIG. 3.

Many recommendation systems struggle to recommend content based on the actual, personal, tastes of a particular user. Instead, many recommendation systems recommend content based on what other users have previously selected (e.g., a recommendation system that uses collaborative filtering). In other words, the measure of similarity utilized by these systems is general in nature: first, these prior systems identify a population of users who have also purchased the item now selected by the current user; then, the prior systems determine other items also purchased by the users in the population of users who have purchased the item of current interest. So the measure of similarity between the current item of interest and any given recommended item relates to the number of users who have purchased both the current item of interest and the recommended item. Among other things, this generalized measure of similarity does not delve into the reasons why the current user or other users may have made the purchase. For example, a user in the user population may have purchased a children's book as a gift and a non-fiction book for themselves. If the current user also purchases the non-fiction book, existing content recommendation systems may recommend the children's book to the current user, even though the children's book bears no relation to the current user's personal interests.

As discussed above, these existing recommendation systems rely on data that is collected over time for a population of users whose interests may or may not be similar to those of the current user. Further still, these systems may be limited to considering only data that is collected as a result of user activity within a single software application (for example, an e-commerce application collects purchase history data for all of its users but may not have access to purchase history data for the population of users of a competing service, or other types of user interaction data collected by other applications, such as content reading/viewing history collected by news and entertainment applications).

As discussed above, existing recommendation systems can make only a generalized assessment of similarity, but do not measure similarity relative to a specific user's preferences. To illustrate this point, if a user entered a search term "Apollo Ohno" into a search engine, the user would receive search results regarding a number of items that involve Apollo Ohno. Because Apollo Ohno is an Olympic speed skater, and Dan Jansen and Eric Heiden are also speed skaters, a content recommendation system may recommend articles that talk about the Olympic speed skating triumphs of Dan Jansen and Eric Heiden. Since to a sports fan, Apollo Ohno is associated with speed skating and the Olympics, these content recommendations would likely be of interest. However, to a fan of reality television or dance, Apollo Ohno may be associated with the TV reality series "Dancing with the Stars." In the context of reality TV, Apollo Ohno may be thought of as similar to other winners of Dancing with the Stars, such as actress Kelly Monaco or singer Nicole Scherzinger. Thus, the reality TV fan would likely prefer content recommendations related to the Dancing with the Stars TV show, Kelly Monaco or Nicole Scherzinger, and would not be interested in articles on other Olympic speed skaters, even though that user entered "Apollo Ohno" as the search term. Current recommendation content systems cannot determine whether the user is a sports fan or a fan of reality TV (unless the user is specifically asked this question or the user otherwise explicitly provides this information). Consequently, using current approaches, a user may receive search results that are of lesser interest to that particular user, even though they may be, in a general, broad-population, sense, highly relevant to the search term that is entered.

Given this observation, a content recommendation subsystem 102 is disclosed herein that is configured to generate content recommendations that are relativized to an individual user's tastes, preferences, or interests (where such tastes, preferences, or interests may be algorithmically derived from the user's own data set). As described in more detail below, the content recommendation system 102 utilizes a modified mathematical definition of similarity that reflects the preferences of a specific user.

A mathematical framework for recommending content can represent content items as feature vectors. In determining whether to recommend a particular content item, a system can compute a similarity metric by performing a numerical comparison of the feature vectors of pairs of content items, where the similarity metric is a measurement of similarity (or "distance") between the two items of content. For example, a similarity metric can be determined by computing the Euclidean distance between the two feature vectors, or by computing the cosine of the angle between the vectors, or by computing a mathematical divergence between probability distributions that are derived by normalizing the feature vectors.

In illustrative embodiments, the content recommendation subsystem 102 creates a probability distribution of the data set 110 (in some cases, the probability distribution of the data set 110 may be referred to as a "language model"), and creates a user preference feature distribution. The user preference feature distribution (which may in some cases be referred to as a "user model") can be derived from the language model (i.e., the probability distribution of the data set 110) by retaining only those items of the data set 110 that are indicative of the user's preferences, interests, or tastes (e.g., items that have been viewed, watched, or purchased by the user). In other words, the user preference distribution is a probability distribution of a user-specific data set that only includes items that indicate user preferences, interests, or tastes. The user-specific data set (which may be referred to as "user activity data 118") may be a subset of the data set 110. The probability distribution of the data set 110 can be generated using, e.g., co-clustering techniques. These mathematical techniques derive feature clusters and/or item clusters from the language model (where a feature cluster or item cluster comprises a grouping of features or items, as the case may be, that are similar according to some similarity measure) (such clusters may be identified by a label or name, such as a category or topic). The clusters learned from the language model are then applied to the user model.

In this way, the illustrative content recommendation subsystem 102 is configured to induce a weighting on the vector space or information space of a data set 110 based on comparing the user preference feature distribution to a "background" feature distribution of the data set 110. For example, in a movie data set where items are movies and features are actors, Clint Eastwood and Brad Pitt might each appear in 1% of the movies available in the movie data set. However, a given user may have given a favorable rating (or at least views by the user) to 5% of the movies starring Clint Eastwood, but only have given a favorable rating to 0.5% of movies starring Brad Pitt. This distribution suggests that the user likes movies starring Eastwood five times as much as the background rate, but likes movies starring Pitt half as much as the background rate. The content recommendation subsystem 102 incorporates these types of user-specific preference ratios as a weighting function into the computation of the similarity metric.

Thus, embodiments of the content recommendation subsystem 102 are configured to utilize user activity data 118 (e.g., data indicating content accessed or viewed by the user, items purchased by the user, etc.) to compute a weighting function that can be incorporated into a similarity metric, which can be used to measure similarity of items of a data set (e.g., pieces of content), and to recommend content based on that similarity metric. For example, the content recommendation subsystem 102 is configured to: first, ascertain that a user is more or less interested in a specific topic relative to other topics in a set of possible topics; and, second, generate or recommend content for the user based on the user's relative interest levels in the set of possible topics. For instance, in the Apollo Ohno example, the possible topics may include "speed skating" and "dancing," and the content recommendation subsystem 102 may recommend content clustered under the "dancing" topic based on the user-relativized similarity metric.

In illustrative embodiments, the content recommendation subsystem 102 uses mathematical (e.g., co-clustering) techniques to derive features (e.g., term clusters) from the data set 110. In other embodiments, the content recommendation subsystem 102 identifies and prioritizes the extracted features based on distinctiveness of the features with respect to the data set as a whole (e.g., based on an evaluation of the number of items in which the extracted feature occurs). That is, the evaluation of extracted features may be performed without going through any kind of clustering process, in some embodiments.

The content recommendation subsystem 102 may receive the items 112 of the data set 110 and may apply a co-clustering algorithm 114 to those items 112, partitioning the data set 110 into clustered data 116. Clustering the data set 110 is a way to organize the data set 110 (e.g., by assigning items and/or features in the data set 110 to more generalized topics or categories, where a topic or category name or label represents a cluster). Clustered data 116 includes one or more item clusters and one or more feature clusters. In illustrative embodiments, the co-clustering algorithm 114 simultaneously partitions the data set 110 into one or more item clusters and one or more feature clusters. By simultaneously partitioning the data set 110 into item clusters and feature clusters, the co-clustering algorithm 114 minimizes the loss of information from the raw data.

In some embodiments, the co-clustering algorithm 114 performs a form of natural language processing. More specifically, the co-clustering algorithm 114 may perform unsupervised machine learning, where the information analyzed by the machine learning algorithm is generated solely from the language contained in the surveyed content (e.g., the data set 110) (which may be a data set that is personal to the user). The co-clustering algorithm 114 identifies relationships between words or phrases (i.e., features) found in the data set 110 using statistical methods, and determines the clustered data 116 based on these relationships. These unsupervised machine learning techniques allow the data set 110 to be sorted and organized without the manual effort of users being involved in the process. As used in this application, an item cluster may refer to a grouping of similar items found in the data set 110. For example, an item in an item cluster may be a document, a video, or a music file. As used in this application, a feature cluster may refer to a grouping of similar features (or features used in an item) from the data set 110. For example, a feature in a feature cluster may be a particular word or phrase found in the items of the data set, or may be information describing the items, such as who is the author of an item (e.g., terms, meta data, etc.). The co-clustering algorithm 114 simultaneously analyzes each item 112 in the data set 110 and separates each feature found in the data set 110 into a feature cluster and each item found in the data set 110 into an item cluster. In illustrative embodiments, each feature in the data set 110 is assigned to only one feature cluster, and each item 112 in the data set 110 is assigned to only one item cluster. While this description refers to performing co-clustering of items and features "simultaneously," those of ordinary skill in the art will appreciate that such processing is subject to the capabilities of the computing system utilized; and that in other embodiments the co-clustering may not be performed simultaneously.

In alternative embodiments, items 112 and features of the data set 110 may be assigned to multiple clusters. For example, topic modeling through Latent Dirichlet Allocation (LDA) is an unsupervised machine learning technique where items and features are assigned to multiple topic clusters (e.g., many to many, as opposed to one to one, topic assignments). Under the LDA model, each item is composed of a probability distribution over topics (these are the latent variables to be inferred by the model) and each topic is composed of a probability distribution over each feature.

In some embodiments, the co-clustering algorithm 114 may also include the use of a manual specification approach to organize the data set 110 into clustered data 116. In a manual specification approach, a user designs a controlled vocabulary of tags to assign to the items 112. These types of vocabularies are taxonomies, or ontologies, and may have associated definitions. Taxonomies can provide an external reference classification system, and thus can identify and track specific topics in a more reliable and consistent manner. These taxonomic vocabularies may include an association for each tag with a set of related words. Each set of related words may be referred to as a language model. When the language models provide a sufficiently rich language set around the tags in the classification, clustered data 116 may be mapped into the external reference vocabulary. Combining manual specification methods with unsupervised learning techniques enables different data sets of information to be mapped to the same reference system.

In some embodiments, the items 112 can be input directly into the user-preference weighting module 126 without any clustering at all. All that is needed is that the features and items are indicative of each other. In other embodiments, the items 112 can be clustered without clustering their features. In other embodiments, the features of the items 112 might be clustered without clustering the items.

The content recommendation subsystem 102 may be configured to generate or access user activity data 118. Using the user activity data 118, the content recommendation subsystem 102 generates a user-preference feature distribution 120. As used in the application, user activity data 118 may refer to any information generated by a user that indicates one or more preferences, interests, or tastes of the user. For example, user activity data 118 may include Internet browsing history, data searching history, a media consumption history (such as books, TV shows, or movies), or any other type of historical data exhibiting the preferences, tastes, or interests of the user. Note that in embodiments where unsupervised machine learning techniques are used, the user activity data 118 is algorithmically derived from other data as opposed to being pre-programmed or manually input by the user.

The content recommendation subsystem 102 may be configured to generate the user-preference feature distribution 120 by mapping the user activity data 118 for a particular user to one or more topics. As noted above, the user activity data 118 may include a subset of the data set 110. Such mapping can be performed by generating a probability distribution over the topics that have been derived from the data set 110 using co-clustering techniques. In other words, by mapping the user activity data 118 to the one or more topics, the content recommendation subsystem 102 generates a probability distribution (which may be referred to as a user preference feature distribution 120), which is indicative of a likelihood that a user is interested in (and thus is likely to select content associated with) a given topic (and the computed likelihood is based on the user activity data 118). Portions of the user preference feature distribution 120 may be supplied to the user preference weighting module 126 from time to time (e.g., in response to an input term 124). In some embodiments, the user-preference data 122 may be embodied as a one-dimensional array of user-preference probability values related to each topic included in the user-preference feature distribution 120. In illustrative embodiments, the one or more topics are related to the one or more item clusters or the one or more feature clusters. In illustrative embodiments, a user-preference feature distribution 120 is generated for each user of the content recommendation subsystem 102. In this way, the content recommendation subsystem 102 is capable of personalizing each content recommendation for each user of the subsystem 102. Stated another way, if two different users enter the same input term or search query, the content recommendation system 102 can nonetheless recommend different content to each of the different users in response to the input term or search query, where the user-specific content recommendations are based on the individual users' preferences as derived from the user activity data 118.

The content recommendation subsystem 102 is configured to receive one or more input terms 124 generated by the user. As used in this application, the one or more input terms may refer to any words or phrases included in a search request generated by the user. For example, a user may generate one or more input terms by entering one or more words or phrases in a search input field of an Internet search engine. In another example, the user may generate input terms by speaking one or more words or phrases into speech recognition software.

The user-preference weighting module 126 may be configured to generate one or more user-specific similarity metrics 136 based on the clustered data 116, the user-preference data 122, and the input terms 124. The user-preference weighting module 126 includes a probability distribution module 128, a user-preference probability distribution module 130, an input term processing module 132, and a similarity metric module 134.

The probability distribution module 128 may be configured to generate a probability distribution of the data set 110 based on the clustered data 116. In illustrative embodiments, the probability distribution is a two-dimensional array of probability values, where each probability value relates to a particular item cluster and a particular feature cluster in the clustered data 116. Each probability value is indicative of the likelihood that a particular feature cluster appears in a particular item cluster, given all of the other occurrences of that particular feature cluster in the data set 110. For example, the items 112 of a data set 110 may comprise movies and a feature of each item may be the actors/actresses in each movie. In this example, item clusters may be embodied as movie genres (e.g., action, romance, comedy) and a particular feature cluster may be embodied as particular actors/actresses (e.g., Clint Eastwood, Audrey Hepburn, and/or Tom Hanks) An individual probability value may comprise the likelihood that Tom Hanks is in an action movie, given all of the movies in which Tom Hanks has appeared. For instance, a probability value that the "Tom Hanks" feature cluster is included in the "action movie" item cluster may be 10%, while the probability value that the "Tom Hanks" feature cluster is in the "romance movie" item cluster may be 45%.

Any specific probability value in the probability distribution is a probabilistic determination based on how frequently the specific features in the feature cluster appear in the specific items of the item cluster in question. For example, a probability distribution may be defined over a certain number of item clusters and feature clusters. In this example, any individual item cluster in the probability distribution is denoted by i and any individual feature cluster in the probability distribution is denoted by j. Each item cluster i is made up of m number of unique items in the data set 110, and each feature cluster j is made up of n number of unique features in the data set 110. In this example, a probability value for any specific cluster pair (ij), composed of an item cluster i and feature cluster j, is a probabilistic determination based on how frequently the features n of the particular feature cluster j, appear in the items m, of the particular item cluster i, given the total occurrences of the features n in the data set 110. In illustrative embodiments, a probability value may be embodied as any value between 0 and 1, and the sum of all values in a probability distribution will be 1.

In the probability distribution, an item cluster vector is a one-dimensional array relating the probability values for a single item cluster to every feature cluster. In the example discussed above, an item cluster vector may be embodied as all of the probability values related to the action movie item cluster. In general, an item cluster vector includes probability values indicative of the occurrence of each feature cluster in the item cluster that defines the item cluster vector.

The user-preference probability distribution module 130 is configured to generate a weighted probability distribution based on the probability distribution generated by the probability distribution module 128 and the user-preference data 122 received from the user-preference feature distribution 120. The weighted probability distribution includes a plurality of weighted probability values corresponding to each item-feature cluster pair. Each weighted probability value is indicative of both the likelihood that a particular feature cluster occurs in a particular item cluster of the data set 110 and a likelihood that a user will select an item 112 from the data set 110 based on the user-preference data 122. The user-preference probability distribution module weights the probability distribution of the data set 110 using the user-preference data 122, which is based on the user activity data 118. In some embodiments, the user-preference weighting module 126 generates the weighted probability distribution for the entire probability distribution. In other embodiments, the user-preference weighting module 126 generates only a partial weighted probability distribution based on which features appear in the input terms 124.

The user-preference probability distribution module 130 also renormalizes the weighted probability distribution in order to attain a distribution that can be used in a divergence metric. In this technique, the item vectors form rows of a two-dimensional array and the feature vectors form columns of the two-dimensional array. Each entry in the two-dimensional array is normalized so that the probability distribution is a joint distribution between items and features. In such a configuration, the sums of each column or row form a marginal distribution. Similarly, before being used to create the weighted probability distribution, the user-preference data 122 may be normalized to obtain different marginal distributions related to the user activity data 118. The weighted probability distribution is a component-wise ratio of these two distributions (probability distribution and user-preference data 122). The probability matrix over the data set 110 is P(item, feature). It can also be represented as P=P(item|feature)*P(feature). The user-preference data 122 may be represented as Q(feature). In such a case, the weighted probability distribution may be defined as P'=P(item|feature)*Q(feature). Divergences applied to item-conditional distributions in the resulting weighted probability distribution are the same as divergences computed by the weighting scheme described above. In some embodiments, the weighted probability distribution is a probability distribution that reflects the individual tastes of the user.

In some embodiments, the weighted probability distribution is defined to lie somewhere between the probability distribution originally derived from the clustered data and the user-preference data 122. This type of weighted probability distribution avoids leaving out features from the data set 110 that the user has not experienced, but that may still be relevant.

The input term processing module 132 may be configured to determine input term data based on the one or more input terms 124 received by the content recommendation subsystem 102 from the user. The input term data is indicative of what feature clusters correspond to the one or more input terms 124. In illustrative embodiments, the features included in the input terms 124 correspond to the features identified in the data set 110. Once the input term processing module 132 identifies the features corresponding to the input terms 124, the input term processing module 132 determines what feature clusters of the clustered data 116 correspond to the input terms 124. For example, if the one or more input terms 124 include the phrase "Tom Hanks," the input term processing module 132 may be configured to identify feature clusters related to the term "Tom Hanks."

In some embodiments, the input term data may include one or more probabilities indicative of likelihoods that the input terms 124 relate to a specific feature cluster in the clustered data 116. For example, input terms 124 generally include a collection of words (e.g., search terms) entered by a user, where each term of the collection of input terms 124 may be found in a different feature cluster. Based on the collection of input terms 124 and the order of the individual terms, the input term processing module 132 may be configured to determine how likely it is that the input terms 124 relate to each feature cluster in the clustered data 116.

The similarity metric module 134 is configured to determine one or more user-specific similarity metrics 136 based on the input term data and the weighted probability distribution. The user-specific similarity metrics 136 are indicative of a similarity between the input term data and the weighted probability distribution.

The similarity metric module 134 compares the weighted probability distribution of the data set 110 to the input term data to determine similarities between the one or more input terms 124 and the data set 110 being analyzed. In illustrative embodiments, the similarity metric module 134 uses a divergence metric, such as a Hellinger divergence metric, to determine the similarities between the input terms 124 and the data set 110. In illustrative embodiments, the individual weighted probability values of the weighted probability distribution may be represented by the vector $\vec{p}_k$, where k represents the probability value of a specific cluster pair. The probability values generated as part of the input term data may be represented by the vector $\vec{r}_k$, where k represents an input term probability value relating the input terms to a particular feature cluster. It should be appreciated that to use any distance or divergence metric both $\vec{p}_k$ and $\vec{r}_k$ must have the same dimensions. Accordingly, in the illustrative embodiments, $\vec{p}_k$ is an item cluster vector and the vector $\vec{r}_k$ is compared to the plurality of item cluster vectors.

Under these conditions, the illustrative similarity metric module 134 calculates the Hellinger divergence using the following equation:

$$H[\vec{p}, \vec{r}] = 1/\sqrt{2} \sqrt{\Sigma_k (\sqrt{p_k} - \sqrt{r_k})^2} \qquad (1)$$

Using the Hellinger divergence equation above, similarities between the data set 110 and the input terms 124 are found by choosing the r that is closest to the p. In other embodiments, the user-specific similarity metric module 134 uses a Kullback-Liebler divergence, or other delta-divergence, to determine similarities. In yet other embodiments, the similarity metric module 134 uses Euclidean metrics, such as cosine, to determine similarities between corpora.

In illustrative embodiments, after determining the divergences between the data set 110 and the input terms 124 based on the weighted probability distribution and the input term data, the similarity metric module 134 generates a user-specific similarity metric 136 for each feature identified in the input terms 124. The content recommendation module 138 may be configured to use the user-specific similarity metric 136 to generate content to output to the user, such as, for example, search results, or search expanders (e.g., query augmentation). The user-specific similarity metric 136 is indicative of how similar the input terms 124 are to cluster pairs in the weighted probability distribution.

In some embodiments, the data set 110 may be embodied as the internet, and the content recommendation module 138 may be configured to deliver search results to the user from the data set 110 in response to the user inputting one or more input terms 124, or search terms. In those embodiments, the content recommendation module 138 may order the search results according to the user-specific similarity metric 136, and deliver the search results to the user in an ordered list. For example, the content recommendation module 138 include at the top of the list the item from 112 whose weighted probability value is most similar to the probability values of the features in the input terms 124.

In other embodiments, the data set 110 may comprise a database of input term 124 expanders. In such embodiments, the content recommendation module 138 may be configured to act as a keyword personalizer. Using a weighted probability distribution of the data set 110, the content recommendation module 138 is configured to algorithmically expand a user's query (i.e., input terms 124) by adding additional query terms that the system determines as similar to the input terms 124 already specified in the query by the user. For example, a query by a first user that includes the term "Ichiro" may be augmented with the term "Yankees" based on the weighted probability distribution of the input term expander data set; whereas, a query by a second user that includes the term "Ichiro" may be augmented with the term "fashion." When the content recommendation module 138 acts as a keyword personalizer using the weighted probability distribution that includes user-preference data 122, the content recommendation module 138 produces results that better reflect the personal preferences and interests of each individual user.

In at least some embodiments, the content recommendation subsystem 102 is language independent, meaning that the technological approach to recommending content may be used to analyze a data set of items written in nearly any foreign language. The content recommendation subsystem 102 does not rely on specific assumptions about the particular structure, grammar, or content of the language used. The same clustered data 116 and weighted probability distributions may be generated for any data set of documents written in nearly any language. Consequently, nearly any data set 110 may be analyzed using the content recommendation subsystem 102 may without modifying the algorithms and methods of the content recommendation subsystem 102.

Figure 2:
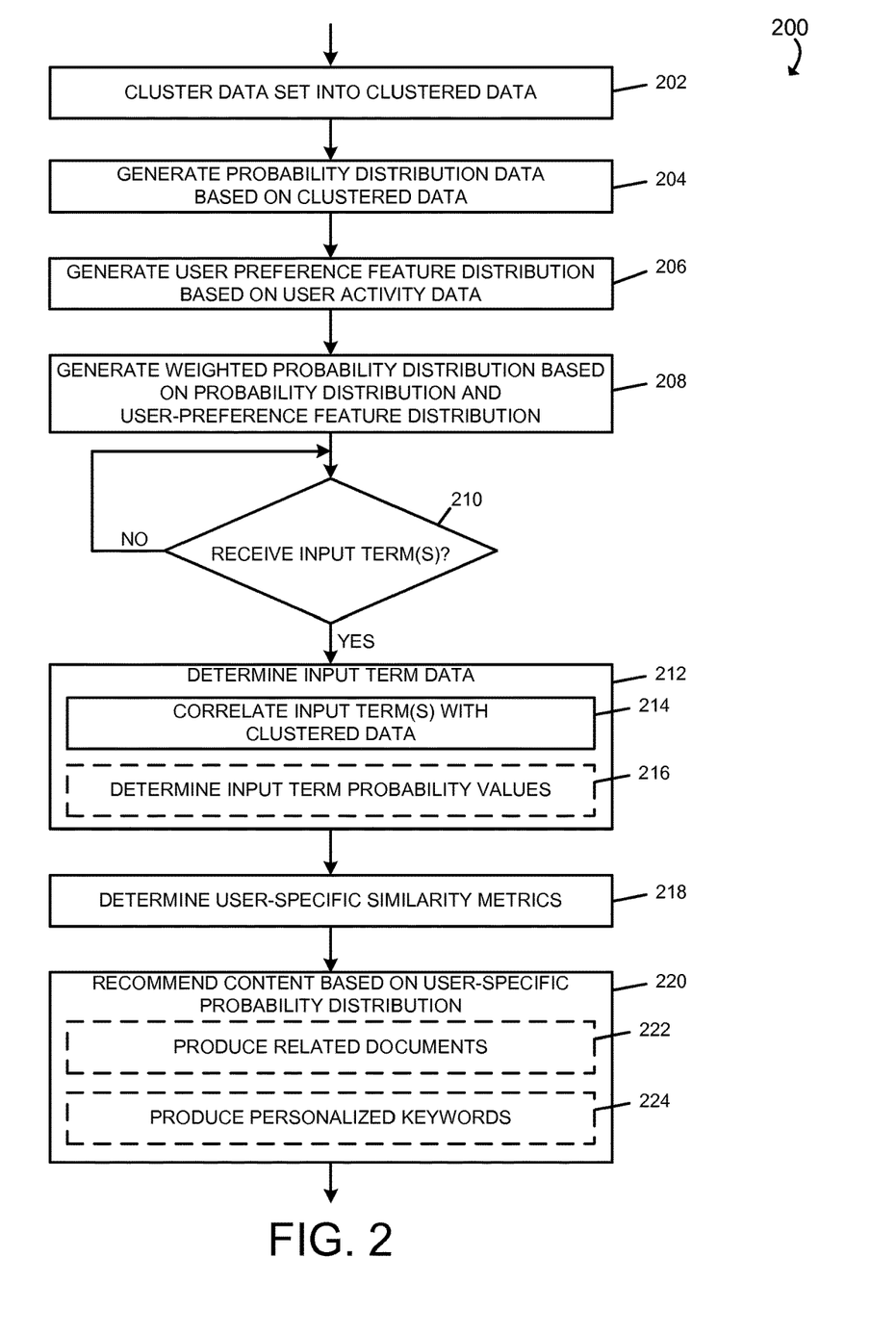
FIG. 2 is a simplified flow diagram of at least one embodiment of a content recommendation process executable by a computing system, such as the computing system of FIG. 1.

Referring to FIG. 2, a simplified flow diagram of at least one embodiment of a process 200 executable by the computing system 100 is shown. The process 200 may be embodied as computerized programs, routines, logic and/or instructions executed by the computing system 100, for example by one or more of the modules and other components shown in FIG. 1 described above. At block 202, the computing system 100 uses a co-clustering algorithm to cluster a data set into clustered data, including one or more item clusters and one or more feature clusters. The data set is comprised of one or more items of information, such as documents, music, or other multimedia files. In one example, the data set (which may be referred to as a "corpus") includes news articles, TV listings, and e-commerce purchase data. Each individual item in the data set may be referred to as a "record" or "document." In some embodiments, e.g., where structured data is available (i.e., data associated with predefined data fields), the data fields and structured data can be used to organize or define the data set. In some embodiments, the items in the data set may be organized by source (e.g., all news articles obtained from News Service X, purchase history on e-commerce site Y, etc.) or multiple data sets can be used (e.g., one data set per source).

At block 204, the computing system 100 generates a probability distribution based on the clustered data of the data set. In illustrative embodiments, the probability distribution is a two-dimensional array made up of item clusters and feature clusters. Each element of the probability distribution is a probability value of an item/feature cluster pair indicative of a likelihood that the feature cluster occurs in the item cluster of the cluster pair, given all of the other occurrences of the feature cluster in the data set. In the illustrative embodiments, the probability distribution is the joint probability density function (jpdf) over all features (e.g., terms) and items (e.g., documents) in the data set (e.g. corpus). Features that only occur a small number of times may be excluded from consideration.

As an example, suppose items are documents and features are words. The document "The cat is on the mat" contains 2 occurrences of the word "the." The document contains 6 total word occurrences over 5 total words. The probability of selecting an occurrence of the word "the" from this document is 2 out of 6, or 33%. The probability of selecting an occurrence of the word "cat" is 1 out of 6, or 17%. Suppose there is a second document, "The cat slept." There are now 2 documents in the data set, with a total of 9 word occurrences. In the joint probability distribution, we measure the likelihood of randomly selecting any word occurrence out of any document in the data set. The probability of getting the word "the" is now 3 out of 9, or 33%. The probability of getting the word "cat" is 2 out of 9, or 22%. The probability of getting an occurrence of the word "the" in the second document is 1 out of 9, or 11%. Clustering sums the occurrence counts for items in a cluster and sums the occurrence counts for features in a cluster to produce a distribution like above, over occurrences, selecting from item clusters and feature clusters rather than from items and features.

At block 206, the computing system 100 generates a user-preference feature distribution for each user based on one or more instances of user activity detected by the computing system 100 for that particular user. From the user-preference feature distribution, the computing system 100 generates user-preference data. The user-preference data is indicative of a likelihood that the user will select a particular item from the data set, given the user's past activity data (e.g., history of selecting items). The user-preference feature distribution is derived by determining what items in a data set have been accessed by a user, for example, which items were seen, read, watched, looked at, and/or bought by the user. In some embodiments, the features of the user-preference feature distribution are correlated with the feature clusters derived from the data set. From the user-preference feature distribution, the computing system 100 generates user-preference data indicative of the one or more user-preference probability values.

As noted above, the user preference feature distribution (or "user model") can initially be derived from the language model by retaining exactly those items (e.g., documents) that were used (e.g., seen, read, watched, looked, or bought) by the user, and then applying the term clusters and/or document clusters learned from the language model to the user model. The user model thus contains joint probability density functions that are analogous to the language model jpdfs. In some embodiments, different data sources of user activity information may be treated differently by the system 100; for example, different data fields may be used differently or different user activities may be treated differently (e.g., documents read may be treated differently than documents accessed).

At block 208, the computing system 100 generates a weighted probability distribution based on the probability distribution of the data set and the user-preference feature distribution. In illustrative embodiments, the weighted probability distribution is a two-dimensional array comprised of weighted probability values related to cluster pairs composed of item clusters and feature clusters. The weighted probability values are indicative of how likely a particular user is to select an item in the data set based on the past activity of the user and the occurrences of those features in the data set.

At block 210, the computing system 100 determines if the user has entered one or more input terms. In illustrative embodiments, a user enters the one or more input terms as part of a query looking for information. At block 212, the computing system 100 determines input term data based on the input terms entered by the user. When determining the input term data, the computing system 100, at block 214, correlates the input terms and the clustered data, in particular, correlates the input terms with the feature clusters. Optionally, at block 216, the computing system 100 as part of the input term data determines one or more input term probability values indicative of a likelihood that the input terms relate to a specific feature cluster.

At block 218, the computing system 100 generates one or more user-specific similarity metrics indicative of a distance between the input term data and the weighted probability distribution. In illustrative embodiments, the user-specific similarity metric is embodied as a divergence (e.g., the Hellinger Divergence) calculated between the weighted probability distribution and the input term data.

At block 220, the computing system 100 recommends content to the user based on the user-specific similarity metrics. In some embodiments, at block 222, the computing system 100 uses the user-specific similarity metrics to produce items from the data set that are related to the input terms. In other embodiments, such as at block 224, the computing system 100 uses the user-specific similarity metrics to recommend personalized keywords to append to the input terms. Personalized keywords may be used as query expanders to try to predict what the user is searching for before they finish entering the input terms. Alternatively, the additional query terms might be sent to the query engine (e.g., without presentation to the user) as a way to direct the engine to return items of higher interest to the user.

The following describes an exemplary use case to illustrate the operation of one embodiment of the content recommendation subsystem 102. Imagine a collection of 6 documents/items and 5 terms/features of interest. The Count Table shown below in Table 1 shows the number of times each term occurs in each document. Suppose clustering puts D1 and D2 into Cluster C1 ("baseball"); D3 and D4 into Cluster C2 ("celebrity"); and D5 and D6 into Cluster C3 ("trends"). The system generates a Compressed Count Table, shown in Table 2 below, by adding up (summing) the columns (occurrence counts) of the Count Table shown in Table 1 that correspond to the items in each cluster. In this example, we are not clustering rows (terms/features).

TABLE 1

Count Table

| | D1 | D2 | D3 | D4 | D5 | D6 |
|---|---|---|---|---|---|---|
| Ichiro | 6 | 8 | 3 | 10 | 2 | 0 |
| Yankees | 10 | 10 | 0 | 0 | 0 | 0 |
| fashion | 0 | 0 | 3 | 9 | 8 | 5 |
| Fukushima | 0 | 0 | 3 | 10 | 5 | 7 |
| computer | 0 | 0 | 0 | 0 | 5 | 10 |

TABLE 2

Compressed Count Table

| | Cluster C1 | Cluster C2 | Cluster C3 |
|---|---|---|---|
| Ichiro | 14 | 13 | 2 |
| Yankees | 20 | 0 | 0 |
| fashion | 0 | 12 | 13 |
| Fukushima | 0 | 13 | 12 |
| computer | 0 | 0 | 15 |

The Language Model shown in Table 3 below is obtained by converting the Compressed Count Table to a probability distribution. Suppose now that User 1 has read documents D1, D2, and D3 and that User 2 has read documents D3, D4, and D5. The User Models in Tables 4 and 5 are obtained the same way, using the clusters from the Language Model.

TABLE 3

Language Model

| Lang. Model | C1 | C2 | C3 |
|---|---|---|---|
| Ichiro | .12 | .11 | .02 |
| Yankees | .18 | 0 | 0 |
| fashion | 0 | .11 | .11 |
| Fukushima | 0 | .11 | .11 |
| computer | 0 | 0 | .13 |
| SUM | .30 | .33 | .37 |

TABLE 4

User 1 Model

| User 1 | C1 | C2 | C3 |
|---|---|---|---|
| Ichiro | .33 | .07 | 0 |
| Yankees | .47 | 0 | 0 |
| fashion | 0 | .07 | 0 |
| Fukushima | 0 | .07 | 0 |
| computer | 0 | 0 | 0 |
| SUM | .79 | .21 | 0 |

TABLE 5

User 2 Model

| User 2 | C1 | C2 | C3 |
|---|---|---|---|
| Ichiro | 0 | .22 | .03 |
| Yankees | 0 | 0 | 0 |
| fashion | 0 | .21 | .14 |
| Fukushima | 0 | .22 | .09 |
| computer | 0 | 0 | .09 |
| SUM | 0 | .66 | .34 |

In this example, we can see that User 1 has a 79% preference for Cluster C1 ("baseball"), compared to the Language Model (baseline) preference of 30% and User 2's preference is 0% for the same cluster. We can compute the user-specific weightings on the clusters shown in the above tables as:

User 1 weighting=(0.79/0.30, 0.21/0.33, 0/0.37)=(2.63, 0.64, 0)

User 2 weighting=(0/0.30, 0.66/0.33, 0.34/0.37)=(0, 2.0, 0.92)

"Ichiro" is represented in the language model as (0.12, 0.11, 0.02), which normalizes to (0.48, 0.44, 0.08). When the User 1 weighting is applied to the language model, this becomes (2.63*0.48, 0.64*0.44, 0*0.08)=(1.26, 0.28, 0) which normalizes to (0.82, 0.18, 0). Compared to the baseline distribution in the language model, this user-specific distribution places higher weight on the "baseball" cluster and lower weight the "trends" cluster.

In the Language Model: Ichiro=(0.48, 0.44, 0.08) and Yankees=(1, 0, 0). The Hellinger distance between these is:

$$1/\sqrt{2}\sqrt{(\sqrt{0.48}-\sqrt{1})^2+(\sqrt{0.44}-\sqrt{0})^2+(\sqrt{0.08}-\sqrt{0})^2}=0.55$$

Under the User 1 weighting these are: Ichiro=(0.82, 0.18, 0) and Yankees=(1, 0, 0). The Hellinger distance between these weighted values is 0.31. This is a smaller distance, meaning that "Yankees" is closer to "Ichiro" for User 1. We can measure how far each term is from "Ichiro" in the Language Model and for each User, as shown in Table 6 below.

TABLE 6

Similarity metrics.

| Distance from "Ichiro" | Language Model | User 1 | User 2 |
|---|---|---|---|
| Yankees | 0.55 | 0.31 | 0.71 |
| fashion | 0.59 | 0.76 | 0.25 |
| Fukushima | 0.58 | 0.76 | 0.23 |
| computer | 0.86 | 0.71 | 0.86 |

As shown above, User 1 associates "Ichiro" with "Yankees" while User 2 associates "Ichiro" with "Fukushima" and "fashion". The content recommendation subsystem 102 takes into account these user-specific weighted term similarities in selecting content to recommend to the user.

Figure 3:
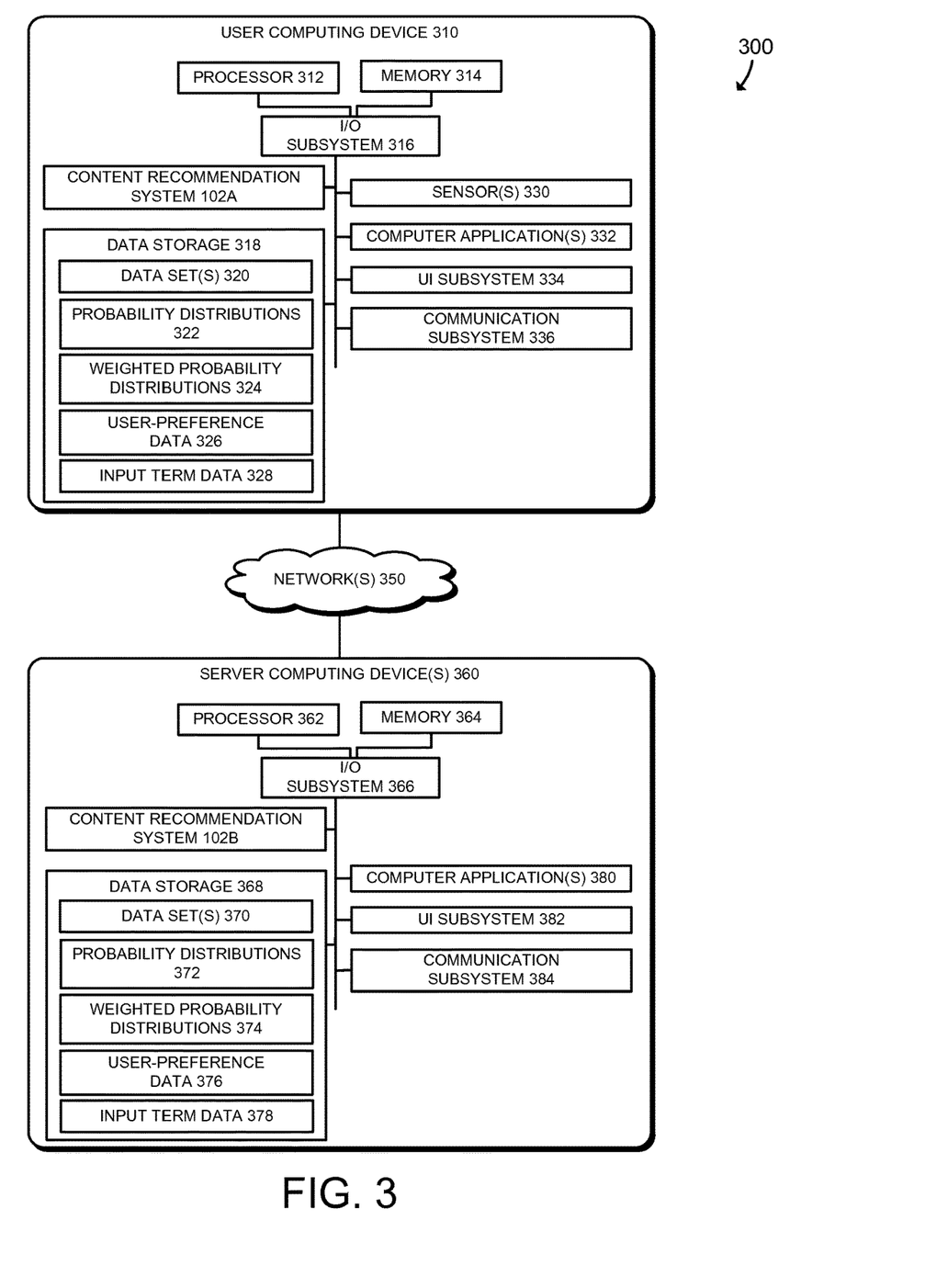
FIG. 3 is a simplified block diagram of at least one embodiment of a computing environment in which the content recommendation subsystem of FIG. 1 may be implemented.

Referring now to FIG. 3, a simplified block diagram of an embodiment 300 of the computing system 100 is shown. While the illustrative computing system 300 is shown as involving multiple computing devices, it should be understood that in some embodiments, the computing system 300 may constitute a single computing device alone. The computing system 300 includes a user computing device 310, which may be in communication with one or more server computing devices 360 via one or more networks 350. The content recommendation subsystem 102, or portions thereof, may be distributed across multiple computing devices 310, 360 that are connected to the network(s) 350 as shown. In other embodiments, however, the content recommendation subsystem 102 may be located entirely on the computing device 310. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by a search engine, content organization system, content management system, big data analytics applications, and/or other applications, systems and devices. As used herein, "module," "component," "subsystem" and similar terminology may refer to computer code, i.e., software developed using a programming language such as Java, Python, or C++, which may be stored in computer memory, e.g., as executable instructions embodied in one or more transitory or non-transitory computer readable media.

The illustrative computing device 310 includes at least one processor 312 (e.g. a microprocessor, microcontroller, digital signal processor, etc.), memory 314, and an input/output (I/O) subsystem 316. The computing device 310 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 316 typically includes, among other things, an I/O controller, a memory controller, and one or more I/O ports. The processor 312 and the I/O subsystem 316 are communicatively coupled to the memory 314. The memory 314 may be embodied as any type of suitable computer memory device (e.g., volatile memory such as various forms of random access memory).

The I/O subsystem 316 is communicatively coupled to a number of hardware and software components and/or other computing systems including a "front end" of the content recommendation subsystem 102A, a user interface subsystem 334, which includes one or more user input devices (e.g., one or more microphones, touchscreens, keyboards, virtual keypads, etc.) and one or more output devices (e.g., speakers, displays, LEDs, haptic devices, etc.). The I/O subsystem 316 is also communicatively coupled to a number of sensors 330, one or more data storage media 318, one or more computer applications 332, and a communication subsystem 336. It should be understood that each of the foregoing components and/or systems may be integrated with the computing device 310 or may be a separate component or system that is in communication with the I/O subsystem 316 (e.g., over a network 350 or a serial bus connection).

The data storage media 318 may include one or more hard drives or other suitable data storage devices (e.g., flash memory, memory cards, memory sticks, and/or others). In some embodiments, portions of the content recommendation subsystem 102A, data set(s) 320, probability distributions 322, weighted probability distributions 324, user-preference data 326, input term data 328 and/or other data reside at least temporarily in the data storage media 318. Portions of the content recommendation subsystem 102A and/or other data may be copied to the memory 314 during operation of the computing device 310, for faster processing or other reasons.

The communication subsystem 336 may communicatively couple the computing device 310 to one or more communication networks 350, e.g., a local area network, wide area network, personal cloud, enterprise cloud, public cloud, and/or the Internet, for example. Accordingly, the communication subsystem 336 may include one or more wired or wireless network interface software, firmware, or hardware, for example, as may be needed pursuant to the specifications and/or design of the particular computing system 100.

The server computing device(s) 360 may be embodied as any suitable type of computing device capable of performing the functions described herein, such as any of the aforementioned types of devices or other electronic devices. For example, in some embodiments, the server computing device(s) 360 may include one or more server computers including data storage media 368, which may be used to store "back end" portions of the content recommendation subsystem 102B, data set(s) 370, probability distributions 372, weighted probability distributions, 374, user-preference data 376, input term data 378 and/or other data. The illustrative server computing device 360 includes one or more processors 362, memory 364, an I/O subsystem 366, data storage media 368, computer applications 380, a user interface subsystem 382, and a communication subsystem 384, each of which may be embodied similarly to the corresponding components of the user computing device 310, respectively, described above. The computing system 300 may include other components, sub-components, and devices not illustrated in FIG. 3 for clarity of the description. In general, the components of the computing system 300 are communicatively coupled as shown in FIG. 3 by signal paths, which may be embodied as any type of wired or wireless signal paths capable of facilitating communication between the respective devices and components.

ADDITIONAL EXAMPLES

Illustrative examples of the technologies disclosed herein are provided below. An embodiment of the technologies may include any one or more, and any combination of, the examples described below.

In an example 1, a method for recommending content to a user based on a data set of the user includes, by a computing system comprising one or more computing devices: creating a probability distribution of the data set, the data set comprising a plurality of items, each item comprising one or more occurrences of a plurality of features, the probability distribution comprising, for each item and feature pair in the data set, a probability value indicative of the proportion of total occurrences of any feature accounted for by that item and feature pair; receiving one or more input terms in response to one or more inputs entered by a user; accessing a user-preference feature distribution indicative of one or more preferences of the user, the user-preference feature distribution indicating a likelihood that the user will select at least one of the pluralities of features or items relative to all other ones of the plurality of features or items of the data set; determining a user-specific similarity metric indicative of a similarity between the one or more input terms and the items of the data set based on the probability distribution of the data set and the user-preference feature distribution; and outputting a content recommendation based on the user-specific similarity metric.

An example 2 includes the subject matter of example 1, and includes: based on the user-specific similarity metric, selecting one or more items to output to the user, each of the selected items being related to the one or more input terms; and ordering the selected items based on the user-specific similarity metric. An example 3 includes the subject matter of example 1 or example 2, and includes: correlating the one or more input terms with one or more features of the data set; and based on the one or more input terms, selecting a subset of the probability distribution related to the one or more features correlated with the one or more input terms, the subset of the probability distribution including the likelihood that each correlated feature occurs in the plurality of items. An example 4 includes the subject matter of any of examples 1-3, wherein the user-preference feature distribution includes a likelihood that the user will select a specific item from the plurality of items of the data set based on one or more historical preferences of the user. An example 5 includes the subject matter of example 4, wherein: the user-preference feature distribution includes different user-preference probability distributions across the plurality of items for different terms and different features based on historical user selections when those particular terms and features are present; and the user-preference feature distribution is selected based on the one or more input terms. An example 6 includes the subject matter of any of examples 1-5, and includes determining the user-specific similarity metric for each item in the data set based on (i) the user-specific similarity metric determined for each item of the data set, (ii) the probability distribution of the item, where the probability distribution of each item includes a likelihood of an occurrence of a feature in the item when compared to all occurrences of that feature in the plurality of items, and (iii) the one or more input terms. An example 7 includes the subject matter of any of examples 1-6, and includes: receiving historical user activity data regarding past selections of items made by the user from the data set; and generating user-preference feature distributions based on the historical user activity data. An example 8 includes the subject matter of example 7, wherein generating user-preference feature distributions comprises generating a plurality of probabilities that a user will select a particular category of content based on past content selections made by the user. An example 9 includes the subject matter of any of examples 1-8, wherein the data set comprises one or more personalized keywords; and wherein the user-specific similarity metric is indicative of a likelihood that one or more personalized keywords in the data set will be entered by the user based on the probability distribution and the user-preference feature distribution; and the method comprises outputting an ordered list of personalized keywords based on the user-specific similarity metric, wherein each personalized keyword is configured to augment the one or more input terms entered by the user.

In an example 10, a method for recommending content based on one or more preferences of a user and a data set comprising a plurality of items includes, by a computing system comprising one or more computing devices: representing the items by a plurality of item clusters and a plurality of feature clusters, the item clusters and the feature clusters algorithmically derived from the data set, the item clusters each comprising at least one item and the feature clusters each comprising at least one feature; creating a probability distribution of the data set by, for each feature cluster in the data set, determining probability distribution data indicative of the proportion of total occurrences of any feature cluster accounted for by that item cluster and feature cluster pair; accessing a user-preference feature distribution indicative of one or more preferences of a user, the user-preference feature distribution including a likelihood the user will select a given one or more of the feature clusters or item clusters relative to all other feature clusters or item clusters of the data set; generating a weighted probability distribution based on comparing the user-preference feature distribution to the probability distribution; receiving one or more input terms in response to one or more actions taken by the user; determining a user-specific similarity metric between the one or more input terms and the weighted probability distribution; and outputting one or more items to the user based on the user-specific similarity metric, where one or more of the item clusters are selected based on the user-specific similarity metric and the one or more items output to the user are chosen from the selected item clusters.

An example 11 includes the subject matter of example 10, wherein determining the user-specific similarity metric comprises determining a mathematical distance between the weighted probability distribution of the data set and the one or more input terms. An example 12 includes the subject matter of example 10 or example 11, and includes: selecting a user-preference feature distribution from a plurality of user-preference feature distributions based on the one or more input terms, where each user-preference feature distributions includes one or more preferences of the user related to one or more different term terms employed by the user previously; and generating the weighted probability distribution based on the selected user-preference feature distribution and the probability distribution. An example 13 includes the subject matter of any of examples 10-12, wherein the user-preference feature distribution comprises a likelihood for each item cluster in the data set that the user will select that specific item cluster from the plurality of item clusters of the data set based on selections of item clusters made previously by the user. An example 14 includes the subject matter of example 13, wherein the user-preference feature distribution further comprises a likelihood for each item in the data set that the user will select that specific item from the plurality of items of the data set based on selections of items made previously by the user. An example 15 includes the subject matter of any of examples 10-14, and includes selecting one or more subsets of the probability distribution of the data set, where each of the subsets of the probability distribution are related to a specific feature cluster and include a distribution of probabilities that the plurality of terms of the specific feature cluster occur in each of the plurality of the item clusters, wherein the selection of the subsets and the feature clusters is determined by correlating the input terms with the terms of each feature cluster. An example 16 includes the subject matter of any of examples 10-15, wherein outputting the items to the user occurs in response to the user entering one or more input terms as part of a query of the data set, the input terms being indicative of a subject matter the query. An example 17 includes the subject matter of any of examples 10-16, wherein the data set comprises one or more personalized keywords; and wherein the user-specific similarity metric is indicative of a likelihood that one or more personalized keywords in the data set will be entered by the user based on the probability distribution and the user-preference feature distribution; and outputting an ordered list of personalized keywords based on the user-specific similarity metric, each personalized keyword configured to extend the one or more input terms entered by the user.

In an example 18, a method for expanding a query based on a data set of a user includes, by a computing system comprising one or more computing devices: creating a probability distribution of the data set, the data set represented by a plurality of feature clusters algorithmically derived from the data set and a plurality of keyword expander clusters algorithmically derived from the data set, by, for each feature cluster and keyword expander cluster pair, determining probability distribution data indicative of a proportion of total occurrences of any feature cluster accounted for by a keyword expander cluster and feature cluster pair; accessing a user-preference feature distribution indicative of one or more query preferences of a user based on queries previously performed by the user; receiving one or more input terms in response to a query being entered by the user, the input terms being derived from the query; determining one or more query expanders to append to the query of the user, the query expanders being selected from the data set of keyword expanders based on the input terms, the probability distribution of the data set, and the user-preference feature distribution; and outputting the one or more query expanders to the user.

An example 19 includes the subject matter of example 18, wherein the query expanders are personalized for each user utilizing a weighted probability distribution of the data set based on a combination of the probability distribution and the user-preference feature distribution. An example 20 includes the subject matter of example 18 or example 19, and includes generating a predictive metric for each query expander, the predictive metric indicative of how likely the user is to enter a query that includes the input terms and the query expander based on the similarities between the input terms and the query expander and based on the preferences of the user.

In an example 21, a method of creating a measure of user-preference includes, with a computing system comprising one or more computing devices: accessing a data set, the data set comprising a plurality of items and each item comprising one or more occurrences of a plurality of features, clustering the data set into a plurality of item clusters; creating a probability distribution of the data set, wherein the probability distribution comprises, for each item cluster and feature combination in the data set, a probability value proportional to the number of occurrences of the feature in the item cluster; identifying a user-specific subset of the data set, the user-specific subset comprising only items that have been used by the user; applying the item clusters to the user-specific subset of the data set; creating a probability distribution of the user-specific subset of the data set, wherein the probability distribution of the user-specific subset of the data set comprises, for each item cluster and feature combination in the user-specific subset of the data set, a probability value proportional to the number of occurrences of the feature in the item cluster; and mathematically comparing the probability distribution of the user-specific subset of the data set to the probability distribution of the data set. An example 22 includes the subject matter of example 21, and includes determining a user preference for one of the item clusters by (i) for each item cluster, summing the probability values of the probability distribution of the user-specific subset of the data set for the features in the item cluster, and (ii) comparing the summed probability values across all of the item clusters. An example 23 includes the subject matter of example 22, and includes computing a user specific weighting for each of the item clusters by, for each item cluster (i) summing the probability values of the probability distribution of the data set as a whole across the features in the item cluster, and (ii) computing a ratio of the sum of the probability values for the user-specific subset of the data set to the sum of the probability values for the data set as whole. An example 24 includes the subject matter of example 23, and includes modifying the probability distribution of the data set by the user-specific weightings.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details.

Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof (e.g., software written using a programming language such as Java, C++, and/or Python). Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for recommending content, the method comprising, by a computing system comprising one or more computing devices:
creating a probability distribution of a data set, the data set comprising a plurality of items, each item comprising one or more occurrences of a plurality of features;
receiving one or more input terms in response to one or more inputs entered by a user;
modifying the probability distribution of the data set by mapping user activity data of the user to one or more topics of the data set to produce a user-preference feature distribution;
wherein the user activity data comprises a subset of the data set;
wherein the user-preference feature distribution comprises a plurality of weighted probability values;
wherein a weighted probability value of the plurality of weighted probability values indicates both (i) a likelihood that a particular feature cluster occurs in a particular item cluster of the data set and (ii) a likelihood that the user will select an item from the data set;
determining a user-specific similarity metric indicative of a similarity between the one or more input terms and one or more items of the data set based on the user-preference feature distribution; and
outputting a content recommendation that is personalized for the user based on the user-specific similarity metric, wherein the content recommendation is used to modify, supplement, or replace a recommendation that is produced by a recommendation system.

2. The method of claim 1, further comprising:
based on the user-specific similarity metric, selecting one or more items to output to the user, each of the selected items being related to the one or more input terms; and
ordering the selected items based on the user-specific similarity metric.

3. The method of claim 1, further comprising:
correlating the one or more input terms with one or more features of the data set; and
based on the one or more input terms, selecting a subset of the probability distribution related to the one or more features correlated with the one or more input terms, the subset of the probability distribution including the likelihood that each correlated feature occurs in the plurality of items.

4. The method of claim 1, wherein the user-preference feature distribution includes a likelihood that the user will select a specific item from the plurality of items of the data set based on one or more historical preferences of the user.

5. The method of claim 4, wherein:
the user-preference feature distribution includes different user-preference probability distributions across the plurality of items for different terms and different features based on historical user selections when those particular terms and features are present; and
the user-preference feature distribution is selected based on the one or more input terms.

6. The method of claim 1, further comprising determining the user-specific similarity metric for each item in the data set based on (i) the user-specific similarity metric determined for each item of the data set, (ii) the probability distribution of the item, where the probability distribution of each item includes a likelihood of an occurrence of a feature in the item when compared to all occurrences of that feature in the plurality of items, and (iii) the one or more input terms.

7. The method of claim 1, further comprising:
receiving historical user activity data regarding past selections of items made by the user from the data set; and
generating user-preference feature distributions based on the historical user activity data.

8. The method of claim 7, wherein generating user-preference feature distributions comprises generating a plurality of probabilities that a user will select a particular category of content based on past content selections made by the user.

9. The method of claim 1, wherein the data set comprises one or more personalized keywords; and wherein the user-specific similarity metric is indicative of a likelihood that one or more personalized keywords in the data set will be entered by the user based on the probability distribution and the user-preference feature distribution; and the method comprises outputting an ordered list of personalized keywords based on the user-specific similarity metric, wherein each personalized keyword is configured to augment the one or more input terms entered by the user.

10. A method for recommending content based on one or more preferences of a user and a data set comprising a plurality of items, the method comprising, by a computing system comprising one or more computing devices, modifying, supplementing, or replacing a recommendation that is produced by a recommendation system by:
representing the items by a plurality of item clusters and a plurality of feature clusters, the item clusters and the feature clusters algorithmically derived from the data set, the item clusters each comprising at least one item and the feature clusters each comprising at least one feature;
creating a probability distribution of the data set by, for each feature cluster in the data set, determining probability distribution data indicative of a proportion of total occurrences of any feature cluster accounted for by that item cluster and feature cluster pair;
modifying the probability distribution of the data set by mapping user activity data of the user to one or more topics of the data set to produce a user-preference feature distribution;
wherein the user activity data comprises a subset of the data set;
wherein the user-preference feature distribution comprises a plurality of weighted probability values;
wherein a weighted probability value of the plurality of weighted probability values indicates both (i) a likelihood that a particular feature cluster occurs in a particular item cluster of the data set and (ii) a likelihood that the user will select an item from the data set;
determining a user-specific similarity metric indicative of a similarity between one or more input terms and one or more items of the data set based on the user-preference feature distribution; and
outputting one or more items to the user based on the user-specific similarity metric, where one or more of the item clusters are selected based on the user-specific similarity metric and the one or more items output to the user are chosen from the selected item clusters.

11. The method of claim 10, wherein determining the user-specific similarity metric comprises determining a mathematical distance between the weighted probability distribution of the data set and the one or more input terms.

12. The method of claim 10, further comprising:
selecting a user-preference feature distribution from a plurality of user-preference feature distributions based on the one or more input terms, where each user-preference feature distributions includes one or more preferences of the user related to one or more different terms employed by the user previously; and
generating the weighted probability distribution based on the selected user-preference feature distribution and the probability distribution.

13. The method of claim 10, wherein the user-preference feature distribution comprises a likelihood for each item cluster in the data set that the user will select that specific item cluster from the plurality of item clusters of the data set based on selections of item clusters made previously by the user.

14. The method of claim 13, wherein the user-preference feature distribution further comprises a likelihood for each item in the data set that the user will select that specific item from the plurality of items of the data set based on selections of items made previously by the user.

15. The method of claim 10, further comprising selecting one or more subsets of the probability distribution of the data set, where each of the subsets of the probability distribution are related to a specific feature cluster and include a distribution of probabilities that the plurality of terms of the specific feature cluster occur in each of the plurality of the item clusters, wherein the selection of the subsets and the feature clusters is determined by correlating the input terms with the terms of each feature cluster.

16. The method of claim 10, wherein outputting the items to the user occurs in response to the user entering one or more input terms as part of a query of the data set, the input terms being indicative of a subject matter query.

17. The method of claim 10, wherein the data set comprises one or more personalized keywords; and wherein the user-specific similarity metric is indicative of a likelihood that one or more personalized keywords in the data set will be entered by the user based on the probability distribution and the user-preference feature distribution; and outputting an ordered list of personalized keywords based on the user-specific similarity metric, each personalized keyword configured to extend the one or more input terms entered by the user.

18. A method for expanding a query produced by a recommendation system, the method comprising, by a computing system comprising one or more computing devices:
creating a probability distribution of a data set;
modifying the probability distribution of the data set by mapping user activity data to one or more topics of the data set to produce a user-preference feature distribution;
wherein the user activity data comprises a subset of the data set;
wherein the user-preference feature distribution comprises a plurality of weighted probability values;
wherein a weighted probability value of the plurality of weighted probability values indicates both (i) a likelihood that a particular feature cluster occurs in a particular item cluster of the data set and (ii) a likelihood that the user will select an item from the data set;
determining one or more query expanders to append to a query of a user, the one or more query expanders being selected from the data set based on the user-preference feature distribution; and
outputting the one or more query expanders to the user.

19. The method of claim 18, wherein the query expanders are personalized for each user utilizing a weighted probability distribution of the data set based on a combination of the probability distribution and the user-preference feature distribution.

20. The method of claim 18, further comprising generating a predictive metric for each query expander, the predictive metric indicative of how likely the user is to enter a query that includes the input terms and the query expander based on the similarities between the input terms and the query expander and based on the preferences of the user.

21. A method of creating a measure of user preference, the method comprising, with a computing system comprising one or more computing devices:

accessing a data set, the data set comprising a plurality of items and each item comprising one or more occurrences of a plurality of features,     clustering the data set into a plurality of item clusters;

creating a probability distribution of the data set, wherein the probability distribution comprises, for each item cluster and feature combination in the data set, a probability value proportional to the number of occurrences of the feature in the item cluster;

modifying the probability distribution of the data set by mapping user activity data of a user to one or more topics of the data set to produce a user-preference feature distribution;

wherein the user activity data comprises a subset of the data set;

wherein the user-preference feature distribution comprises a plurality of weighted probability values;

wherein a weighted probability value of the plurality of weighted probability values indicates both (i) a likelihood that a particular feature cluster occurs in a particular item cluster of the data set and (ii) a likelihood that the user will select an item from the data set;

making available the user-preference feature distribution for use by a recommendation system to modify, supplement, or replace a user-preference feature distribution that is produced by the recommendation system.

22. The method of claim 21, comprising determining a user preference for one of the item clusters by (i) for each item cluster, summing the probability values of the probability distribution of the user-specific subset of the data set for the features in the item cluster, and (ii) comparing the summed probability values across all of the item clusters.

23. The method of claim 22, comprising computing a user specific weighting for each of the item clusters by, for each item cluster (i) summing the probability values of the probability distribution of the data set as a whole across the features in the item cluster, and (ii) computing a ratio of the sum of the probability values for the user-specific subset of the data set to the sum of the probability values for the data set as a whole.

24. The method of claim 23, comprising modifying the probability distribution of the data set by the user-specific weightings.

* * * * *